(12) United States Patent
Watanabe et al.

(10) Patent No.: US 7,609,839 B2
(45) Date of Patent: Oct. 27, 2009

(54) QUANTUM KEY DISTRIBUTION METHOD AND COMMUNICATION DEVICE

(75) Inventors: Youdai Watanabe, Saitama (JP); Wataru Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 577 days.

(21) Appl. No.: 10/528,075

(22) PCT Filed: Sep. 12, 2003

(86) PCT No.: PCT/JP03/11706

§ 371 (c)(1),
(2), (4) Date: Sep. 19, 2005

(87) PCT Pub. No.: WO2004/028074

PCT Pub. Date: Apr. 1, 2004

(65) Prior Publication Data

US 2006/0059403 A1    Mar. 16, 2006

(30) Foreign Application Priority Data

Sep. 18, 2002    (JP)  .............................. 2002-271473

(51) Int. Cl.
*H04L 9/08*    (2006.01)
*H03M 13/00*    (2006.01)

(52) U.S. Cl. .......................... 380/278; 380/44; 380/255; 380/256; 380/279; 714/758; 714/780; 713/189; 726/14

(58) Field of Classification Search ................. 380/278, 380/256
See application file for complete search history.

(56) References Cited

U.S. PATENT DOCUMENTS

| | | | | |
|---|---|---|---|---|
| 5,732,139 | A * | 3/1998 | Lo et al. | 380/28 |
| 7,457,416 | B1 * | 11/2008 | Elliott | 380/256 |
| 7,492,904 | B2 * | 2/2009 | Young | 380/278 |
| 2002/0048370 | A1 * | 4/2002 | Hirota et al. | 380/278 |
| 2006/0059343 | A1 * | 3/2006 | Berzanskis et al. | 713/171 |
| 2006/0093143 | A1 * | 5/2006 | Maeda et al. | 380/256 |

FOREIGN PATENT DOCUMENTS

JP    10-13251 A    1/1998

OTHER PUBLICATIONS

Wu, C.-K., and Dawson, E.: 'Generalised inverses in public key cryptosystem design'. IEE Proc. Comput. Digit. Tech., vol. 145, No. 5, Sep. 1998, pp. 321-326.*

(Continued)

*Primary Examiner*—William R Korzuch
*Assistant Examiner*—Sarah Su
(74) *Attorney, Agent, or Firm*—Birch, Stewart, Kolasch & Birch, LLP

(57) ABSTRACT

In order to create a highly-secured common key while a data error on a transmission path is corrected by an error correction code having remarkably high characteristics, in a quantum key distribution method of the invention, at first a communication apparatus on a reception side corrects the data error of reception data by a deterministic, stable-characteristics parity check matrix for a "Irregular-LDPC code." The communication apparatus on the reception side and a communication apparatus on a transmission side discard a part of pieces of the common information according to public error correction information.

24 Claims, 9 Drawing Sheets

OTHER PUBLICATIONS

Yamazaki, "Ryoshi Ango Kagi Haisokei no Tame no Ayamari Teisei Fugo", 2001 Nen The Institute of Electronics, Information and Communication Engineers Sogo Taikai Koen Ronunshu, Kiso Kyokai, Mar. 7, 2001, pp. 556-557.

Kou et al., "Low density parity check codes:Construction based on finite geometrics", 2001 IEEE Globecom, received on Jan. 31, 2001, pahes 825-829.

Chung et al., "Analysis of sum-product decoding of low-density parity-check codes using a Gaussian approximation", IEEE Transactions on Information Theory, vol. 47, No. 2, received on Apr. 9, 2001, pp. 657-670.

Bennett et al., "Quantum cryptography:Public key distribution and coin tossing", International Conference on Computers, Systems & Signal Processing, India, Dec. 10-12, 1984.

Brassard et al., Secret-key reconciliation by public discussion, In Advances in Cryptology, Eurocrypt '93, Lecture notes in Computer Science 765, pp. 410-423.

Toshio, Hasegawa et al., "Quantum Encryption Technology", Mitsubishi Denki Giho, vol. 76, No. 4, Mitsubishi Electric Engineering Company Limited, pp. 27-30.

Watanabe, Yodai et al., "On the Error Correction in Quantum Key Distribution".

Chung, Sae-Young et al., "Analysis of Sum-Product Decoding of Low-Density Parity- Check Codes Using a Gaussian Approximation", IEEE, Sep. 19, 2000.

Uchiyama, "Ryoshi Rikigaku no Kiso to Ryoshi Ango Ryoshi Tsushin Channel no Shiten", Suuri Kagaku No. 12, vol. 34, Dec. 1, 1996, pp. 53-61.

Yamazaki, "Ryoshi Ango Kagi Haisokei no Tame no Ayamari Teisei Fugo", 2001 Nen The Institute of Electronics, Information and Communication Engineers Sogo Taikai Koen Ronunshu, Kiso Kyokai, Mar. 7, 2001, pp. 556-557.

Kou et al., "Low density parity check codes:Construction based on finite geometrics", 2001 IEEE Globecom, received on Jan. 31, 2001, pahes 825-829.

Chung et al., "Analysis of sum-product decoding of low-density parity-check codes using a Gaussian approximation", IEEE Transactions on Information Theory, vol. 47, No. 2, received on Apr. 9, 2001, pp. 657-670.

Bennett et al., "Quantum cryptography:Public key distribution and coin tossing", International Conference on Computers, Systems & Signal Processing, India, Dec. 10-12, 1984.

Brassard et al., Secret-key reconciliation by public discussion, In Advances in Cryptology, Eurocrypt '93, Lecture notes in Computer Science 765, pp. 410-423.

* cited by examiner

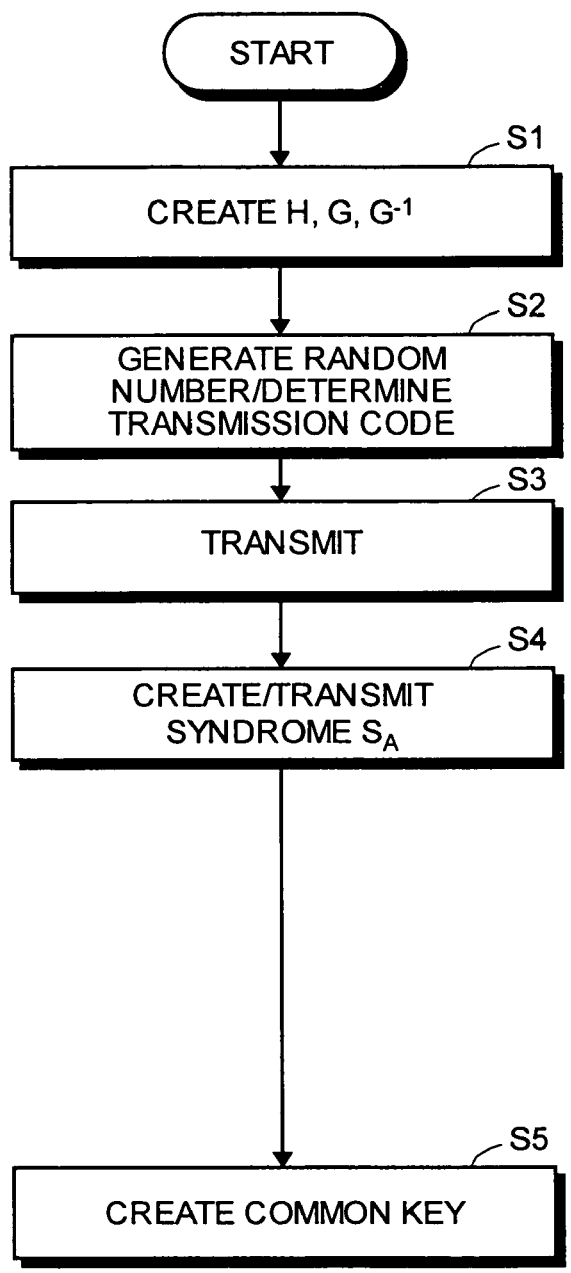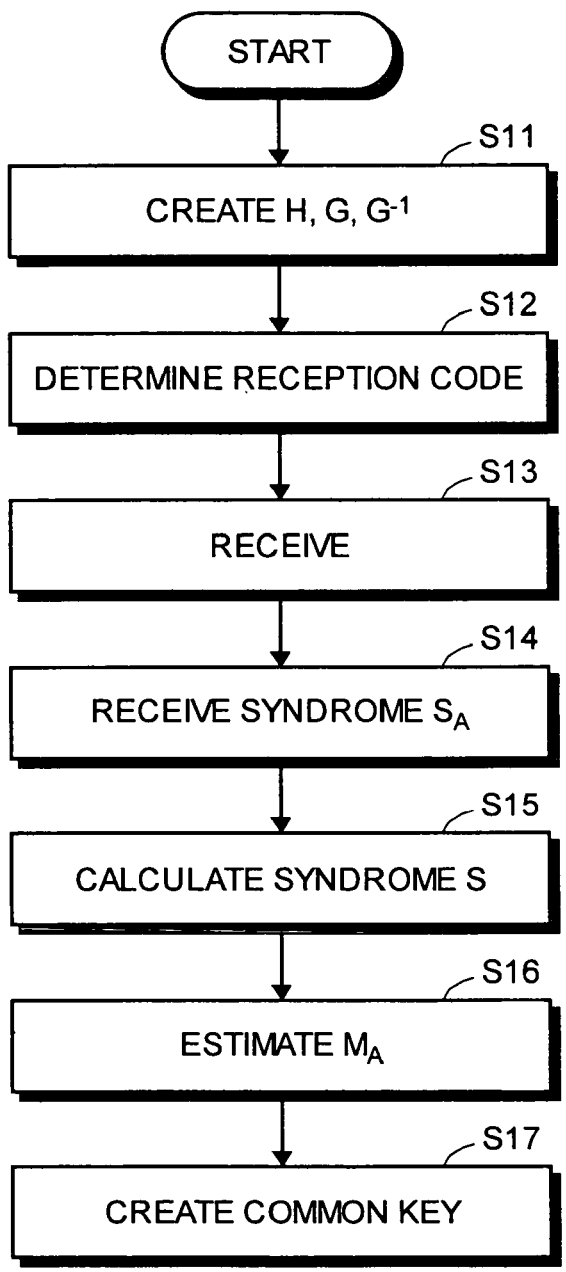

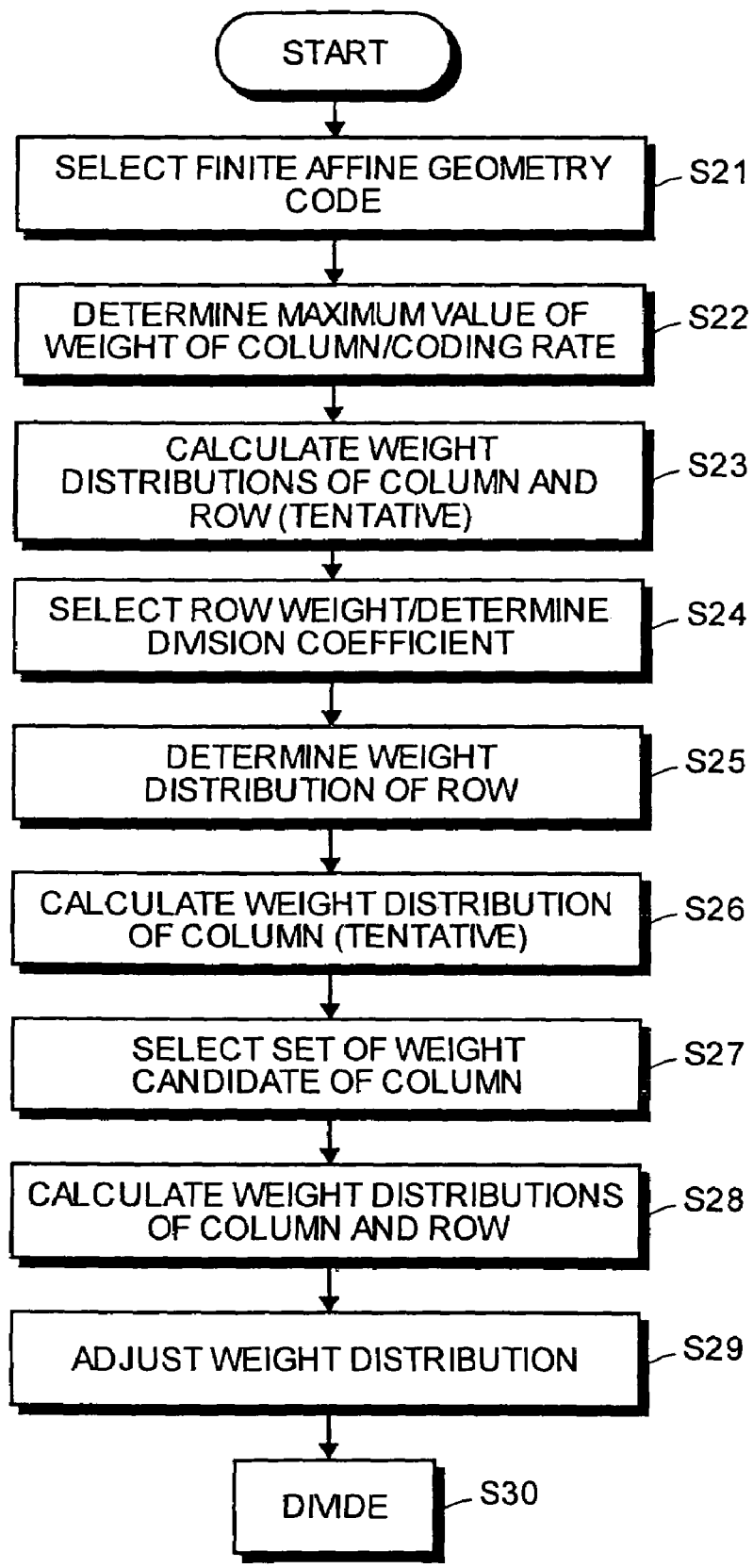

FIG.5

| rate | 0.5 | |
|---|---|---|
| N | 12.6 | |

| i | $\gamma_i$ | $\lambda(\gamma_i)$ | $n(\gamma_i)$ |
|---|---|---|---|
| 1 | 2 | 0.27381 | 69 |
| 2 | 3 | 0.10714 | 18 |
| 3 | 8 | 0.61905 | 39 |

| u | $\rho_u$ | nu |
|---|---|---|
| 8 | 1 | 63 |

QUANTUM KEY DISTRIBUTION METHOD AND COMMUNICATION DEVICE

TECHNICAL FIELD

The present invention relates to a quantum key distribution method with which it is possible to create a highly-secured common key, and particularly to the quantum key distribution method with which it is possible correct data error by an error correction code, and to a communication apparatus that can realize the quantum key distribution.

BACKGROUND ART

A conventional quantum cryptosystem is described below. Recently, optical communications, which allow high-speed, large-capacity communication, have been widely used. In such an optical communication system, the communication is performed by turning a light beam on and off. When the light beam is turned on, a large quantity of photons are transmitted, so that such optical communication system does not directly produce the quantum effect.

On the other hand, in the quantum cryptosystem, the photon is used as a communication medium, and information of one bit is transmitted by one photon so that the quantum effect such as the uncertainty principle is generated. If a person who wants to tap the communication (hereinafter, "interceptor") randomly selects a base to measure the photon without knowing a quantum state such as a phase, the quantum state is changed. Therefore, on a receiver side, it is possible to recognize whether transmission data is intercepted by confirming the change in quantum state of the photon.

FIG. 9 is an overview of a conventional quantum key distribution utilizing polarization. For example, a measuring apparatus, which can identify the light polarized in a horizontal direction from the light polarized in a vertical direction, correctly identifies the light polarized in the horizontal direction (0°) on a quantum communication path from the light polarized in the vertical direction (90°) on the quantum communication path. On the other hand, another measuring apparatus, which can identify the light polarized in an oblique direction (45°, 135°), correctly identifies the light polarized in the oblique direction of 45° on a quantum communication path from the light polarized in the oblique direction of 135° on the quantum communication path.

As described above, each measuring apparatus can correctly recognize the light polarized in the specified direction. However, when the light polarized in the oblique direction is measured with the measuring apparatus that can identify the light polarized in the horizontal direction from the light polarized in the vertical direction, the apparatus recognizes the light polarized in the horizontal direction (0°) and the light polarized in the vertical direction (90°) with the probability of 50% respectively. Namely, when a measuring apparatus that does not match the identifiable polarized direction is used, even if the measurement result is analyzed, the polarized direction cannot be correctly identified.

In the quantum key distribution shown in FIG. 9, by utilizing the uncertainty (randomness), a person who transmits the data (transmitter) and a person who receives the data (receiver) share a key without being known by the interceptor (Patent Literature 1). The transmitter and the receiver can also use a public communication path in addition to the quantum communication path. A procedure of sharing the key is described.

The transmitter first generates a random number sequence (sequence of 1 and 0: transmission data) and randomly chooses a transmission code (+: the code corresponding to the measuring apparatus that can identify the light polarized in the horizontal direction from the light polarized in the vertical direction, and ×: the code corresponding to the measuring apparatus that can identify the light polarized in the oblique direction). The combination of the random number sequence and the transmission code can automatically set the polarized direction of the transmitted light. In this case, the light polarized in the horizontal direction by the combination of 0 and +, the light polarized in the vertical direction by the combination of 1 and +, the light polarized in the 45° direction by the combination of 0 and ×, and the light polarized in the 135° direction by the combination of 1 and × are transmitted to the quantum communication path (transmission signal).

The receiver randomly chooses a reception code (+: the code corresponding to the measuring apparatus that can identify the light polarized in the horizontal direction from the light polarized in the vertical direction, and ×: the code corresponding to the measuring apparatus that can identify the light polarized in the oblique direction) and measures the light on the quantum communication path (reception signal). The receiver obtains reception data by the combination of the reception code and the reception signal. In this case, 0 is obtained as the reception data by the combination of the light polarized in the horizontal direction and +, 1 is obtained as the reception data by the combination of the light polarized in the vertical direction and +, 0 is obtained as the reception data by the combination of the light polarized in the 45° direction and ×, and 0 is obtained as the reception data by the combination of the light polarized in the 135° direction and ×.

The receiver then transmits the reception code to the transmitter through the public communication path in order to check whether the receiver has performed a measurement with an appropriate measuring apparatus. Having received the reception code, the transmitter checks whether the measurement of the receiver has been performed with an appropriate measuring apparatus. The transmitter transmits the result to the receiver through the public communication path.

The receiver then saves (keeps behind) only the reception data corresponding to the reception signal which is received with the appropriate measuring apparatus, and discards other pieces of the reception data. At this point, the transmitter and the receiver can securely share the saved reception data.

The transmitter and the receiver then transmit the predetermined number of pieces of data selected from the common data to each other through the public communication path. The transmitter and the receiver confirm whether the received data corresponds to the data owned by oneself. For example, when even one piece of the confirmed data does not correspond to the data owned by the transmitter or the receiver, judging that the interceptor is present, they discard the common data and perform the process of sharing the key again from the start. On the other hand, when the confirmed data completely corresponds to the data owned by the transmitter or the receiver, judging that there is no interceptor, the transmitter and the receiver discard the data used for the confirmation, and the saved common data becomes the common key for the transmitter and the receiver.

Application of the conventional quantum key distribution method includes the quantum key distribution method that can correct data error on a transmission path.

In the method, in order to detect the data error, the transmitter divides the transmission data into a plurality of blocks and transmits parity in each block onto the public communication path. The receiver compares the parity in each block received through the public communication path, to the parity of the corresponding block in the reception data and checks the data error. When a different parity is present, the receiver transmits a reply of the information indicating which parity of the block is different onto the public communication path. The transmitter further divides the appropriate block into a first half block and a second half block and transmits, for example, the first half parity onto the public communication path (binary search). The transmitter and the receiver then specify a position of an error bit by repeating the binary search, and the receiver finally corrects the specified bit.

Assuming that it is determined that a parity is correct due to even number of errors even if an error is present in the data, the transmitter randomly permutates the transmission data (random permutation) to divide the transmission data into a plurality of blocks and performs the error correction processing by the binary search again. All the data errors are corrected by repeatedly executing the error correction processing by the random permutation.

Patent Literature 1: Bennett. C. H. and Brassard, G.: Quantum Cryptography: Public Key Distribution and Coin Tossing, In Proceedings of IEEE Conference on Computers, System and Signal Processing, Bangalore, India, pp. 175-179 (DECEMBER 1984).

Patent Literature 2: Brassard, G. and Salvail, L. 1993 Secret-Key Reconciliation by Public Discussion, In Advances in Cryptology—EUROCRYPT '93, Lecture Notes in Computer Science 765, 410-423.

In the conventional quantum key distribution shown in FIG. 9, however, an error communication path is not considered. When an error is present, the common data (common key) is discarded because an intercepting action is presumed to be present. Therefore, there is a problem that creation efficiency of the common key is correspondingly affected in some transmission paths.

In the quantum key distribution method that can correct the data error on the transmission path, huge number of exchanges of the parity is generated for specifying the error bit, and the error correction processing is also performed in a predetermined times by the random permutation. Therefore, there is a problem that a long period of time is required for the error correction processing.

It is an object of the present invention to provide a quantum key distribution method that can create a highly-secured common key while correcting data error on a transmission path by an error correction code having remarkably high characteristics.

DISCLOSURE OF THE INVENTION

A quantum key distribution method according to the present invention is employed on a quantum cryptosystem including a first communication apparatus that transmits photons onto a quantum communication path and a second communication apparatus that measures the photons. The method includes, for example, a check matrix creation step of each of the first communication apparatus and the second communication apparatus creating the same parity check matrices H(n×k); a random number generation step of the first communication apparatus generating a random number sequence (transmission data) and randomly determining a predetermined transmission code (base) by the first communication apparatus, and the second communication apparatus randomly determining a predetermined reception code (base); a photon transmission step of the first communication apparatus transmitting a photon onto the quantum communication path while the photon is in a quantum state specified by a combination of the transmission data and the transmission code; a photon reception step of the second communication apparatus measuring the photon transmitted on the quantum communication path to obtain reception data specified by the combination of the reception code and measurement result; a data deletion step of each of the first communication apparatus and the second communication apparatus deciding whether the measuring has been performed with an appropriate measuring apparatus, saving the reception data of n bits if the measuring has been performed with the appropriate measuring apparatus and transmission data that corresponds to the reception data, and discarding other pieces of the data; an error correction information notification step of the first communication apparatus notifying the second communication apparatus through a public communication path of error correction information of k bits based on the parity check matrix H and the transmission data of n bits; an error correction step of the second communication apparatus correcting the error of the reception data based on the parity check matrix H, the reception data of n bits, and the error correction information; and a cryptographic key creation step of each of the first communication apparatus and the second communication apparatus discarding a part (k) of pieces of the common information (n) after correction according to public error correction information, creating a cryptographic key using information that has remained after discarding, and setting the cryptographic key as a common key which is shared between apparatuses.

According to the invention, the data error of the common information is corrected by a deterministic and stable-characteristics parity check matrix for "Irregular-LDPC code", and a part of the common information is discarded depending on the public error correction information.

BRIEF DESCRIPTION OF THE DRAWINGS

FIGS. 2A and 2B are flowcharts of a process procedure for the quantum key distribution according to the first embodiment; FIG. 3 is a flowchart of forming "Irregular-LDPC code" based on finite affine geometry; FIG. 5 depicts a final weight distribution of column $\lambda(\gamma_i)$ and a final weight distribution of row $\rho_u$.

BEST MODE FOR CARRYING OUT THE INVENTION

Exemplary embodiments of a quantum key distribution method according to the present invention are described with reference to the accompanying drawings. It should be noted that the invention is not limited to the exemplary embodiments. Although a quantum key distribution utilizing a polarized light is described below as an example, the invention can be also applied to the quantum key distribution utilizing a phase, the quantum key distribution utilizing a frequency, and the like, and the invention does not particularly limit what quantum state is utilized.

FIRST EMBODIMENT

The quantum key distribution is a key distribution method, which is security-guaranteed regardless of computational ability of interceptors. However, for example, in order to create a common key more efficiently, it is necessary to remove the data error generated when the data passes through the transmission path. Therefore, the quantum key distribution which performs the error correction by a Low-Density Parity-Check (LDPC) code is described in this embodiment. It is known that the LDPC code has remarkably high characteristics.

Figure 1:
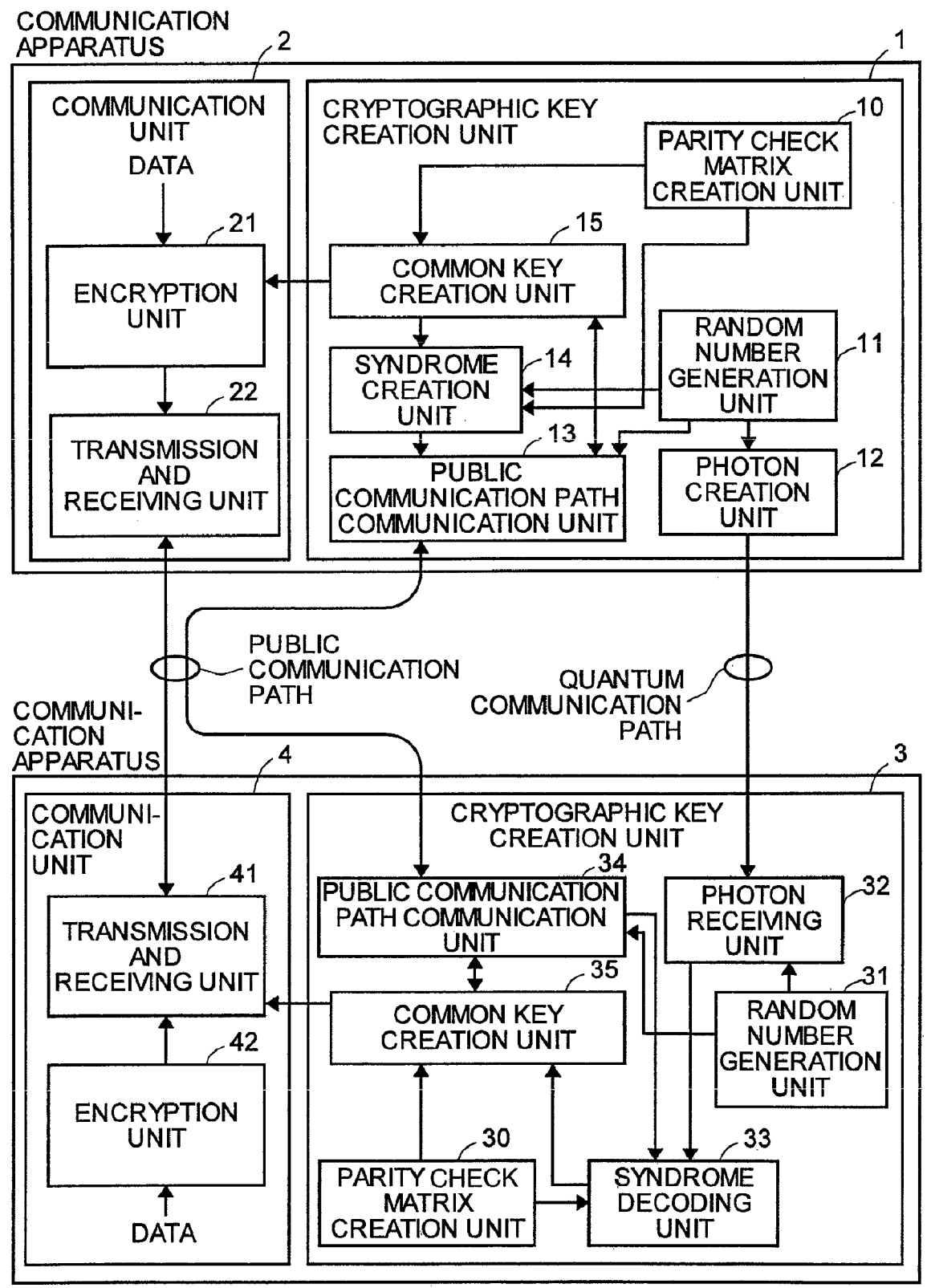
FIG. 1 depicts a configuration of a quantum cryptosystem according to a first embodiment of the invention.

FIG. 1 depicts a configuration of the communication apparatus (transmission device and receiving device) in the quantum cryptosystem according to the first embodiment of the invention. The quantum cryptosystem includes the communication apparatus on the transmission side having a function of transmitting information $m_a$ and the communication apparatus on the reception side having the function of receiving information $m_a$ which is affected by a noise or the like on the transmission path, i.e. information $m_b$.

The communication apparatus on the transmission side includes a cryptographic key creation unit 1 and a communication unit 2. The cryptographic key creation unit 1 transmits the information $m_a$ through the quantum communication path, transmits a syndrome $S_A$ through the public communication path, and creates a cryptographic key (common key with the reception side) based on the information $m_a$ and the syndrome $S_A$. In the communication unit 2, an encryption unit 21 encrypts the data based on the cryptographic key and a transmission and receiving unit 22 exchanges the data through the public communication path. The communication apparatus on the reception side includes a cryptographic key creation unit 3 and a communication unit 4. The cryptographic key creation unit 3 receives the information $m_b$ through the quantum communication path, receives the syndrome $S_A$ through the public communication path, and creates the cryptographic key (common key with the transmission side) based on the information $m_b$ and the syndrome $S_A$. In the communication unit 4, an encryption unit 42 encrypts the data based on the cryptographic key and a transmission and receiving unit 41 exchanges the data through the public communication path.

Figure 9:
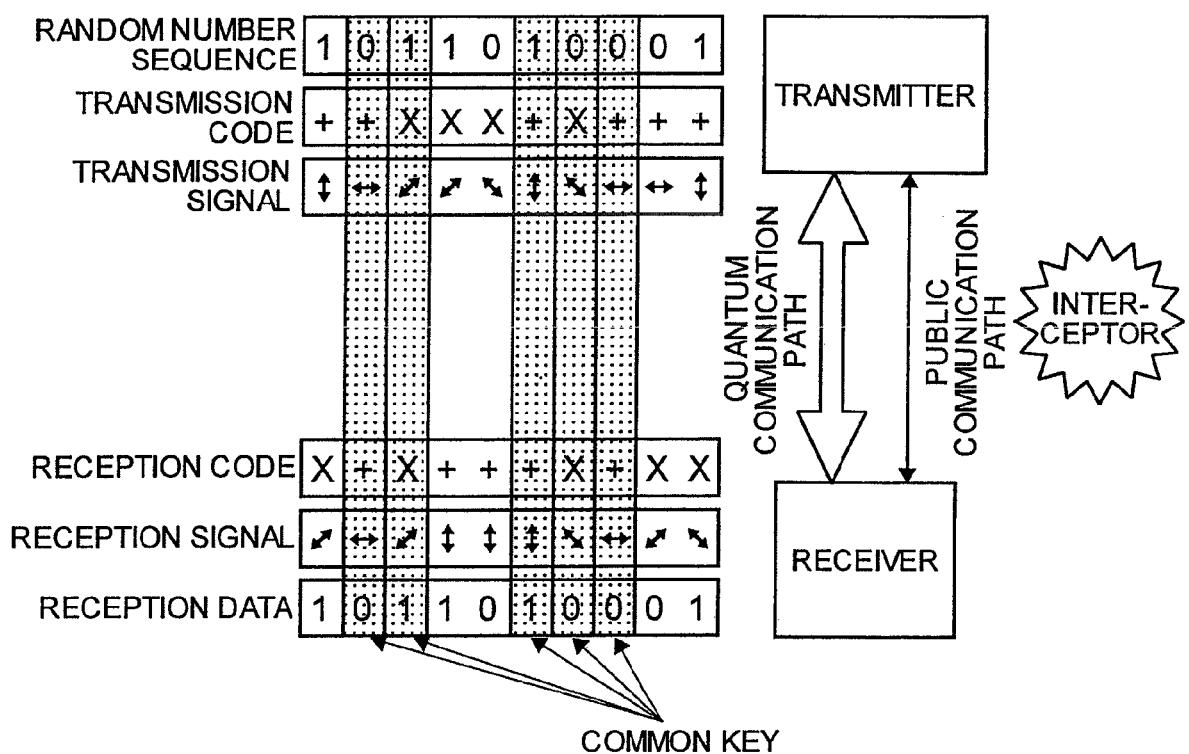
FIG. 9 is an overview of a conventional quantum key distribution.

In the communication apparatus on the transmission side, the light polarized in the predetermined direction with a polarization filter (see FIG. 9) is transmitted as the information $m_b$ transmitted onto the quantum communication path to the communication apparatus on the reception side. On the other hand, in the communication apparatus on the reception side, the light polarized in the horizontal direction (0°) on the quantum communication path, the light polarized in the vertical direction (90°) on the quantum communication path, the light polarized in the oblique direction of 45° on the quantum communication path, and the light polarized in the oblique direction of 135° on the quantum communication path are identified by the measuring apparatus that can identify the light polarized in the horizontal direction (0°) from the light polarized in the vertical direction (90°) and the measuring apparatus that can identify the light polarized in the oblique direction (45°) from the light polarized in the oblique direction (135°). Each measuring apparatus can correctly recognize the light which is polarized in the specified direction. However, when the light polarized in the oblique direction is measured with the measuring apparatus that can identify the light polarized in the horizontal direction (0°) from the light polarized in the vertical direction (90°), the measuring apparatus recognizes the light polarized in the horizontal direction and the light polarized in the vertical direction with the probability of 50% respectively. Namely, when the measuring apparatus that does not match the identifiable polarized direction is used, even if the measurement result is analyzed, the polarized direction cannot be correctly identified.

The operation of each communication apparatus in the quantum cryptosystem, i.e., the quantum key distribution according to the embodiment is described in detail below. FIGS. 2A and 2B are flowcharts of a process procedure for the quantum key distribution according to the first embodiment, particularly FIG. 2A depicts a process procedure performed by the communication apparatus on the transmission side and FIG. 2B depicts a process procedure performed by the communication apparatus on the reception side.

In the communication apparatus on the transmission side and the communication apparatus on the reception side, parity check matrix creation units 10 and 30 obtain a parity check matrix H(n×k) of a specific linear code, a creation matrix G((n−k)×n) satisfying "HG=0" from the parity check matrix H, and an inverse matrix $G^{-1}$(n×(n−k)) of the creation matrix G, and further obtain the inverse matrix $G^{-1}$ satisfying $G^{-1} \cdot G = I$ (unit matrix) (step S1 and step S11). The quantum key distribution of an instance that the LDPC code having the excellent characteristics extremely close to Shannon limit is used as the specific linear code is described in this embodiment. The LDPC code is used as the error correction method in this embodiment. This embodiment is not limited to the LDPC code, and it is also possible to use other linear codes such as a turbo code. Further, as long as error correction information (syndrome) described later is an error correction protocol expressed by a product $Hm_A$ of a proper matrix H and information $m_A$ (for example, the error correction protocol corresponding to "the quantum key distribution which can correct the data error on the transmission path" described in the Background art), namely as long as the linearity of the error correction information and the linearity of the information $m_A$ are secured, the matrix H may be used as the specific linear code.

A method of forming the LDPC code in the parity check matrix creation unit 10, particularly the method of forming an "Irregular-LDPC code" based on affine finite geometry (Details of step S1 in FIG. 2) is described. The description of the parity check matrix creation unit 30 is omitted because the operation of the parity check matrix creation unit 30 is identical as the parity check matrix creation unit 10. In this embodiment, check matrix creation processing may be configured to be performed according to a set parameter by the parity check matrix creation unit 10, or the check matrix creation processing may be configured to be performed by other control units (such as a computer) outside the communication apparatus. When the check matrix creation processing in this embodiment is performed outside the communication apparatus, the already created check matrix is stored in the communication apparatus. An instance of the above processing being performed by the parity check matrix creation unit 10 is described below.

Figure 4:
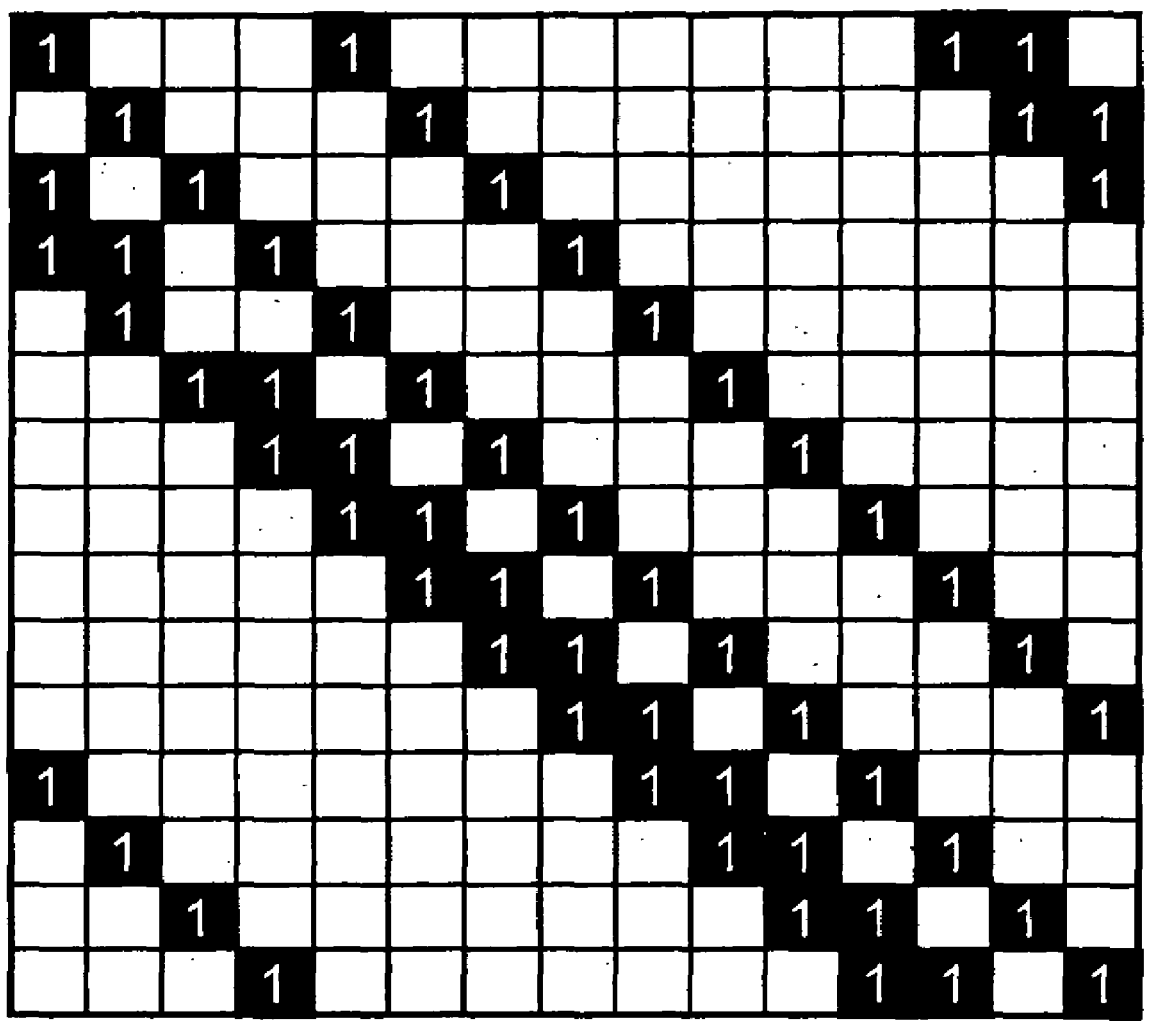
FIG. 4 depicts a matrix of finite affine geometry code AG $(2, 2^2)$.

The parity check matrix creation unit 10 selects a finite affine geometry code AG(2,$2^S$) which becomes a base of the check matrix for "Irregular-LDPC code" (FIG. 3, step S21). In this case, a weight of a row and the weight of a column become $2^S$, respectively. FIG. 4 depicts, for example, the matrix of the finite affine geometry code AG (2, $2^2$) (a blank in the matrix indicates 0).

The parity check matrix creation unit 10 then determines a maximum value $r_l$ ($2 < r_l \leq 2^S$) of the weight of the column (step S22). The parity check matrix creation unit 10 also determines a coding rate (1-syndrome length/key length) (step S22), The parity check matrix creation unit 10 then uses optimization of Gaussian approximation and tentatively determines a weight distribution of the column $\lambda(\gamma_i)$ and a weight distribution of the row $\rho_u$ (step S23). A creation function $\rho(x)$ of the weight distribution of the row is set to $\rho(x)=\rho_u x^{u-1}+(1-\rho_u)x^u$. A weight u is an integer of $u\geq 2$, and $\rho_u$ indicates a portion of the weight u in the row.

The parity check matrix creation unit 10 selects the weight of the row {u, u+1} which can be formed by dividing the row of the finite affine geometry, and determines a division coefficient $\{b_u, bu_{+1}\}$ which satisfies the following equation (1), where $b_u$ and $b_{u+1}$ are a non-negative integer (step S24).

$$b_u+b_{u+1}(u+1)=2^s \quad (1)$$

Specifically, $b_{u+1}$ is determined from the equation (1) after determining $b_u$ from:

$$\arg\cdot\min_{bu}\left|\varphi_u-\frac{u\times b_u}{2^s}\right| \quad (2)$$

The parity check matrix creation unit 10 then determines the weight distributions $\rho_u'$ and $\rho_{u+1}'$ of the row updated by the determined parameters u, u+1, $b_u$, and $b_{u+1}$ (by the row division processing mentioned above) from (step S25):

$$\varphi_u'=\frac{u\times b_u}{2^s} \quad (3)$$

$$\varphi_{u+1}'=\frac{(u+1)\times b_{u+1}}{2_s}$$

The parity check matrix creation unit 10 then uses the optimization of Gaussian approximation, sets u, u+1, $\rho_u'$, and $\rho_{u+1}'$ determined by the calculation to the fixed parameter, and tentatively determines the weight distribution of the column $\lambda(\gamma_i)$ (step S26). The weight $\gamma_i$ is an integer of $\gamma_i\geq 2$, and $\lambda(\gamma_i)$ indicates a portion of the weight $\gamma_i$ in the column. The parity check matrix creation unit 10 also deletes the weight in which the number of column is not more than 1 ($\lambda(\gamma_i)\leq\gamma_i/w_t$, i is a positive integer) from candidates. However, $w_t$ indicates the total number of 1 included in AG(2,$2^S$).

The parity check matrix creation unit 10 then selects a set of a weight candidate of the column $\{\gamma_1, \gamma_2, \ldots \gamma_l (\gamma_i\leq 2^S)\}$ which satisfies the weight distribution determined above and the following equation (4) (step S27). When the weight of the column $\gamma_i$, which does not satisfy the following equation (4), is present, it is deleted from the candidates.

$$\begin{bmatrix} a_{1,1} & a_{1,2} & \cdots & a_{1,l} \\ a_{2,1} & a_{2,2} & \cdots & a_{2,l} \\ \vdots & & \cdots & \vdots \end{bmatrix}\begin{bmatrix}\gamma_1\\\gamma_2\\\vdots\\\gamma_l\end{bmatrix}=\begin{bmatrix}2^s\\2^s\\\vdots\\2^s\end{bmatrix} \quad (4)$$

In equation 4, "a" indicates the coefficient which becomes a non-negative integer to $\{\gamma_1, \gamma_2, \ldots \gamma_l\}$ for forming the weight of the column $2^S$, i and j are positive integers, $\gamma_i$ indicates the weight of the column, and $\gamma_l$ indicates the maximum weight of the column.

The parity check matrix creation unit 10 then uses the optimization of Gaussian approximation, sets u, u+1, $\rho_u'$, $\rho_{u+1}'$, and $\{\gamma_1, \gamma_2, \ldots, \gamma_l\}$ determined above to the fixed parameter, and determines the weight distribution $\lambda(\gamma_i)$ and the weight distribution of the row $\rho_u$ (step S28).

The parity check matrix creation unit 10 then adjusts the weight distribution of the column $\lambda(\gamma_i)$ and the weight distribution of the row $\rho_u$ before the division processing (step S29). Each weight distribution after the adjustment is set to a value close to the value determined by Gaussian approximation as much as possible. FIG. 5 depicts a final weight distribution of column $\lambda(\gamma_i)$ and the final weight distribution of row $\rho_u$.

Finally, the parity check matrix creation unit 10 divides the row and the column in the finite affine geometry (step S30) and creates the parity check matrix H of n×k. In the division processing of the finite affine geometry code in the invention, the finite affine geometry code is not regularly divided, but the number of "1" is randomly extracted from each row or each column (see the specific example of random division described later). Any method can be used as the extraction processing as long as the randomness is held.

Specifically, when the row number of "1" in the first row in EG(2,$2^5$) is expressed as: $B_1(x)=\{1\ 32\ 114\ 136\ 149\ 223\ 260\ 382\ 402\ 438\ 467\ 507\ 574\ 579\ 588\ 622\ 634\ 637\ 638\ 676\ 717\ 728\ 790\ 851\ 861\ 879\ 947\ 954\ 971\ 977\ 979\ 998\}$; the number of "1" is randomly extracted from $B_1(x)$, and, for example the first row to the fourth row $R_m(n)$ in the matrix after the division become as follows:

$R_1(n)=\{1\ 114\ 574\ 637\ 851\ 879\ 977\ 979\}$
$R_2(n)=\{32\ 136\ 402\ 467\ 588\ 728\ 861\ 971\}$
$R_3(n)=\{149\ 260\ 382\ 438\ 579\ 638\ 717\ 998\}$
$R_4(n)=\{223\ 507\ 622\ 634\ 676\ 790\ 947\ 954\}$.

An example of the random division, i.e. the "division method using a Latin square matrix of a random sequence" is described in detail below. When the random division is performed, the random sequence is easily and deterministically created. The advantage of this method is that the transmission side and the reception side can create the same random sequence. The procedure of the division method is as follows:

(1) The basic random sequence is prepared. At this point, the finite affine geometry AG(2,$2^S$) is used, and the basic random sequence C(i) is prepared according to the equation (5) when P is set to a minimum prime number satisfying $P\geq 2^S$.

$$C(1)=1$$

$$C(i+1)=G_0\times C(i)\bmod P \quad (5)$$

Where i=0, 1, . . . , P–2, and $G_0$, is a primitive element of Galois field GF(P). The number larger than $2^S$ is deleted from C(i) so that a series length becomes $2^S$, and C(i) after the deletion is set to the basic random sequence.

(2) A skip interval S(j) for reading the basic random sequence C(i) at a constant interval is defined as:

$$S(j)=j\ j=1, 2, \ldots, 2^s \quad (6)$$

(3) A permutation pattern $LB_j(i)$ is prepared by:

$$LB_j(i)=((S(j)\times i)\bmod P)+1$$

$$j=1, 2, \ldots, 2^s$$

$$i=1, 2, \ldots, P-1 \quad (7)$$

The number larger than $2^S$ is deleted from $LB_j(i)$.

(4) A jth Latin square matrix $L_{jp}(i)$ defined by q columns and i rows is calculated by:

$$L_{jq}(i)=LB_j(((q+i-2)\bmod 2^s)+1)$$

$$j=1, 2, \ldots, 2^s$$

$$i=1, 2, \ldots, 2^s$$

$$q=1, 2, \ldots, 2^s \quad (8)$$

(5) The column and the row are divided according to the Latin square matrix $L_{jp}(i)$. In the division of the column, $g_0, g_1, \ldots, g_{n-1}$ is set to a column vector of the parity check matrix H, and $g_c'(k)$ is set to kth "1" in the column of $g_c$ (c=0, 1, . . . , n−1). A set of positions of "1" in $g_c$ is set to $G_c$ (see equation (9)).

$$G_c = \{g_c'(k), k=1, 2, \ldots, 2^s\} \quad (9)$$

For example, the row number of "1" in the column of c=1-st of AG(2, $2^3$) becomes $G_1=\{1\ 3\ 8\ 20\ 23\ 24\ 34\ 58\}$. When the c-th column vector is expressed by $g_c'(k)$, the c-th column vector can be expressed by:

$$g_c'(1)=((c-1)+1)\mod(2^{2s}-1)$$

$$g_c'(2)=(g_c'(1)+2)\mod(2^{2s}-1)$$

$$g_c'(3)=(g_c'(2)+5)\mod(2^{2s}-1)$$

$$g_c'(4)=(g_c'(3)+12)\mod(2^{2s}-1)$$

$$g_c'(5)=(g_c'(4)+3)\mod(2^{2s}-1)$$

$$g_c'(6)=(g_c'(5)+1)\mod(2^{2s}-1)$$

$$g_c'(7)=(g_c'(6)+10)\mod(2^{2s}-1)$$

$$g_c'(8)=(g_c'(7)+24)\mod(2^{2s}-1) \quad (10)$$

At this point, each column $g_c$ of the parity check matrix H is divided into the new column $g_{c,e}$ based on a degree and the coefficient of the column satisfying the equation (4). $g_{c,e}'(r)$ is set to "1" of the r-th row in the new column $g_{c,e}$ (see equation (11)).

$$G_{c,e} = \{g_{c,e}'(r), r=1, 2, \ldots\} \quad (11)$$

An edge which is divided according to the following equation (12) is selected by the Latin square matrix group. Where $a_{t,1}, a_{t,2}, \ldots, a_{t,l}$ and $\gamma_1, \gamma_2, \ldots, \gamma_l$ are the coefficient and the degree which satisfy the equation (4) respectively, and, t indicates the row number of a coefficient matrix. When the column number of the finite affine plane divided by the equation of the tth row is set to $n_t$ and the maximum value of the row number of the coefficient matrix is set to $t_m$, t can be expressed by the following equation (13).

$$g_{c,e}'(r) = g_c'(L_{j,q}(i)) \quad (12)$$
$$j = c/2^s$$
$$q = ((c-1)\mod 2^s) + 1$$
$$i = r + \sum_{m=1}^{t} \min\left(a_{t,m}, \max\left(o, e-1-\sum_{n=1}^{m-1} a_{t,n}\right)\right) \cdot \gamma_m$$

$$t \begin{cases} 1 (1 \leq c \leq n_1) \\ 2(n_1 + 1 \leq c \leq n_1 + n_2) \\ \vdots \\ t_m\left(\sum_{i=1}^{tm-1} n_i + 1 \leq c \leq \sum_{i=2}^{tm} n_i\right) \end{cases} \quad (13)$$

Figure 6:
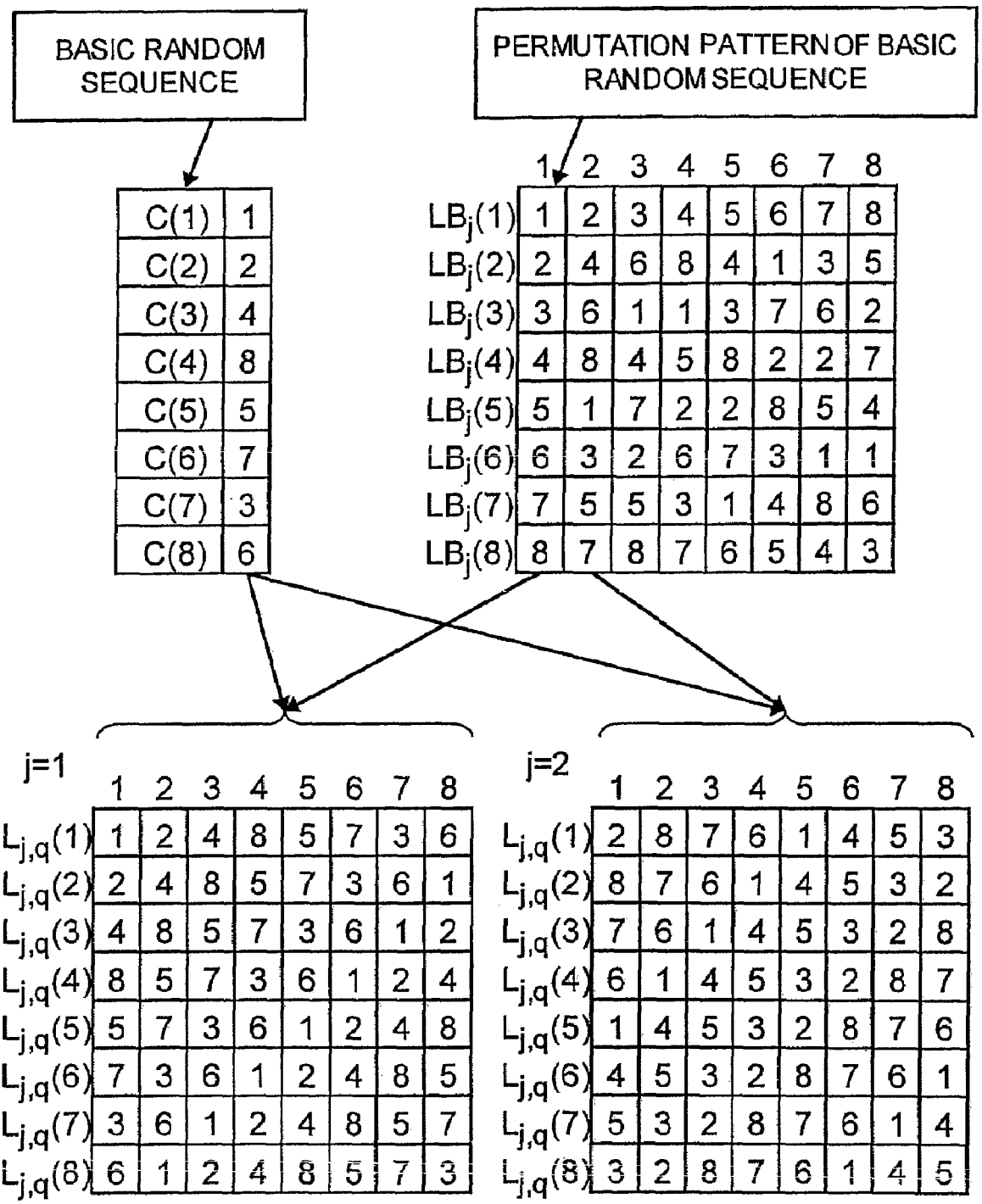
FIG. 6 depicts a division procedure performed by a Latin square matrix of a random sequence.

The division processing explained in items (1) to (4) is described below with a specific example. For example, the row number of "1" in the column of c=1-st of AG(2, $2^3$) is defined as $G_{16}=\{10\ 16\ 18\ 23\ 35\ 38\ 39\ 49\}$. FIG. 6 depicts a division procedure performed by the Latin square matrix of the random sequence. When the procedure (5) is performed by the result of the Latin square matrix, "1" in the new column $g_{16,e}$ can be expressed by the following equation (14).

$$g_{16,1}'(1)=g_{16}'(L_{2,8}(1))=g_{16}'(3)=18$$

$$g_{16,1}'(2)=g_{16}'(L_{2,8}(2))=g_{16}'(2)=16$$

$$g_{16,2}'(1)=g_{16}'(L_{2,8}(3))=g_{16}'(8)=49$$

$$g_{16,2}'(2)=g_{16}'(L_{2,8}(4))=g_{16}'(7)=39$$

$$g_{16,3}'(1)=g_{16}'(L_{2,8}(5))=g_{16}'(6)=38$$

$$g_{16,3}'(2)=g_{16}'(L_{2,8}(6))=g_{16}'(1)=10$$

$$g_{16,4}'(1)=g_{16}'(L_{2,8}(7))=g_{16}'(4)=23$$

$$g_{16,4}'(2)=g_{16}'(L_{2,8}(8))=g_{16}'(5)=35 \quad (14)$$

As a result, the 16th column is, divided as follows:

$$G_{16,1}=\{18\ 16\}$$

$$G_{16,2}=\{49\ 39\}$$

$$G_{16,3}=\{38\ 10\}$$

$$G_{16,4}=\{23\ 35\}$$

As described above, the deterministic, stable-characteristics check matrix H(n×k) for the "Irregular-LDPC code" can be created by performing the method of forming the "Irregular-LDPC code" based on the affine finite geometry (FIG. 2A, step S1).

After the parity check matrix H and the creation matrix G and $G^{-1}$ ($G^{-1}\cdot G$=I: unit matrix) are created in the above manner, in the communication apparatus on the transmission side, a random number generation unit 11 generates the random number sequence (sequence of 1 and 0: transmission data) and randomly determines the transmission code (+: the code corresponding to the measuring apparatus that can identify the light polarized in the horizontal direction from the light polarized in the vertical direction, ×: the code corresponding to the measuring apparatus that can identify the light polarized in the oblique direction) (step S2). On the other hand, in the communication apparatus on the reception side, a random number generation unit 31 randomly determines a reception code (+: the code corresponding to the measuring apparatus that can identify the light polarized in the horizontal direction from the light polarized in the vertical direction, and ×: the code corresponding to the measuring apparatus that can identify the light polarized in the oblique direction) (step S12).

In the communication apparatus on the transmission side, a photon creation unit 12 transmits the photon in the polarized direction automatically determined by the combination of the random number sequence and the transmission code (step S3). For example, the light polarized in the horizontal direction by the combination of 0 and +, the light polarized in the vertical direction by the combination of 1 and +, the light polarized in the 45° direction by the combination of 0 and ×, and the light polarized in the 135° direction by the combination of 1 and × are transmitted to the quantum communication path respectively (transmission signal).

In the communication apparatus on the reception side, a photon receiving unit 32 that has received the light signal generated from the photon creation unit 12 measures the light on the quantum communication channel (reception signal). The photon receiving unit 32 obtains the reception data automatically determined by the combination of the reception code and the reception signal (step S13). In this case, 0 is obtained as the reception data by the combination of the light polarized in the horizontal direction and +, 1 is obtained as the reception data by the combination of the light polarized in the vertical direction and +, 0 is obtained as the reception data by the combination of the light polarized in the 45° direction and ×, and 0 is obtained as the reception data by the combination of the light polarized in the 135° direction and × respectively.

In the communication apparatus on the reception side, the random number generation unit 31 transmits the reception code to the communication apparatus on the transmission side through the public communication path in order to check whether the measurement has been performed with an appropriate measuring apparatus (step S13). When the communication apparatus on the transmission side receives the reception code, the communication apparatus on the transmission side checks whether the measurement has been performed with an appropriate measuring apparatus. The transmitter transmits the result to the communication apparatus on the reception side through the public communication path (step S3). The communication apparatus on the reception side and the communication apparatus on the transmission side save only the data corresponding to the reception signal which has received with the appropriate measuring apparatus and discard other pieces of the reception data (step S3 and step S13). The saved data is then stored in the memory or the like, and the n bits of the data are sequentially read out from the front end of the data to create transmission data $m_A$ and reception data $m_B$ ($m_B$ is $m_A$ which is affected by the noise and the like on the transmission path). Namely, the next n bits are read out after each completion of the common key creation processing, and the transmission data $m_A$ and the reception data $m_B$ are created in each case. In this embodiment, the position of the bit corresponding to the reception signal received by the appropriate measuring apparatus can be shared between the communication apparatus on the transmission side and the communication apparatus on the reception side.

In the communication apparatus on the transmission side, a syndrome creation unit 14 calculates syndrome $S_A = Hm_A$ of $m_A$ by the parity check matrix H(n×k) and the transmission data $m_A$ and notifies a public communication path communication unit 13 and the communication apparatus on the reception side of the result through the public communication path (step S4). At this step, there is a possibility that the syndrome $S_A$ of $m_A$ (information of k bits) is known by the interceptor. On the other hand, in the communication apparatus on the reception side, public communication path communication unit 34 receives the syndrome $S_A$ of $m_A$ and notifies a syndrome decoding unit 33 of the syndrome $S_A$ of $m_A$ (step S14).

The syndrome decoding unit 33 calculates syndrome $S_B = Hm_B$ of $m_B$ by the parity check matrix H and the reception data $m_B$ and further calculates syndrome $S = S_A + S_B$ by the syndrome $S_A$ of $m_A$ and the syndrome $S_B$ of $m_B$ (step S15). The syndrome decoding unit 33 estimates transmission data $m_A$ based on the syndrome S (step S16). At this point, it is assumed that $m_A = m_A + e$ (noise and the like) and the syndromes is deformed as shown in the equation (15). "e" is accordingly obtained by syndrome decoding, and the transmission data $m_A$ is obtained (step S16). "+" of $S = S_A + S_B$ and $m_A + e$ indicates exclusive OR.

$$\begin{aligned} S &= S_A + S_B \\ &= Hm_A + Hm_B \\ &= H(m_A + m_B) \\ &= H(m_A + m_A + e) \\ &= HE \end{aligned} \quad (15)$$

Finally, In the communication apparatus on the reception side, a common key creation unit 35 discards a part of pieces of the common information ($m_A$) according to the public error correction information (the information of k bits having a possibility of the intercept: $S_A$) and creates the cryptographic key r including the amount of information of n−k bits (step S17). Namely, the common key creation unit 35 creates the cryptographic key r from the following equation (16) by the $G^{-1}$ (n×(n−k)) which is calculated in advance. The communication apparatus on the reception side shares the cryptographic key r with the communication apparatus on the transmission side.

$$r = G^{-1} m_A \quad (16)$$

On the other hand, in the communication apparatus on the transmission side, a common key creation unit 15 discards a part of pieces of the common-information ($m_A$) according to the public error correction information (the information of k bits having a possibility of the intercept: $S_A$) and creates the cryptographic key r including the amount of information of n−k bits (step S5). Namely, the common key creation unit 15 creates the cryptographic key r from the following equation (16) by the $G^{-1}$(n×(n−k)) which is calculated in advance (step S5). The communication apparatus on the transmission side shares the cryptographic key r with the communication apparatus on the reception side.

As described above, in this embodiment, the data error of the common information is corrected by the deterministic, stable-characteristics parity check matrix H(n×k) for the "Irregular-LDPC code" and a part of pieces of the common information is discarded according to the public error correction information. Accordingly, the huge number of exchanges of the parity for specifying and correcting the error bit is avoided and error correction control is performed only by transmitting the error correction information, so that the time for the error correction processing is considerably reduced. Further, since a part of pieces of the common information is discarded according to the public error correction information, the highly-secured common key can be created.

In this embodiment, the inverse matrix $G^{-1}$(n×(n−k)) which becomes $G^{-1} \cdot G = I$ (unit matrix) is created from the creation matrix G(n×(n−k)) satisfying HG=0, a part (k) of pieces of the common information (n) is discarded by the inverse matrix $G^{-1}$, and the cryptographic key r including the amount of information of n−k bits. However, the invention is not limited to the embodiment, and a part of pieces of the common information (n) may be discarded and the cryptographic key r including the amount of information of m bits (m≦n−k). Specifically, a mapping F(·) which maps an n-dimensional vector to an m-dimensional vector is assumed. In order to secure the common key, it is necessary that F(·) satisfies the condition that "the number of elements of a reverse image $(F \cdot G)^{-1}(v)$ in a composition mapping F·G of the mapping F and the creation matrix G is independent of an arbitrary m-dimensional vector v and is constant($2^{n-k-m}$)." At this point, the cryptographic key r becomes $r = F(m_A)$.

SECOND EMBODIMENT

In the second embodiment, confidentiality of the cryptographic key r according to the first embodiment is further enhanced.

Figure 7:
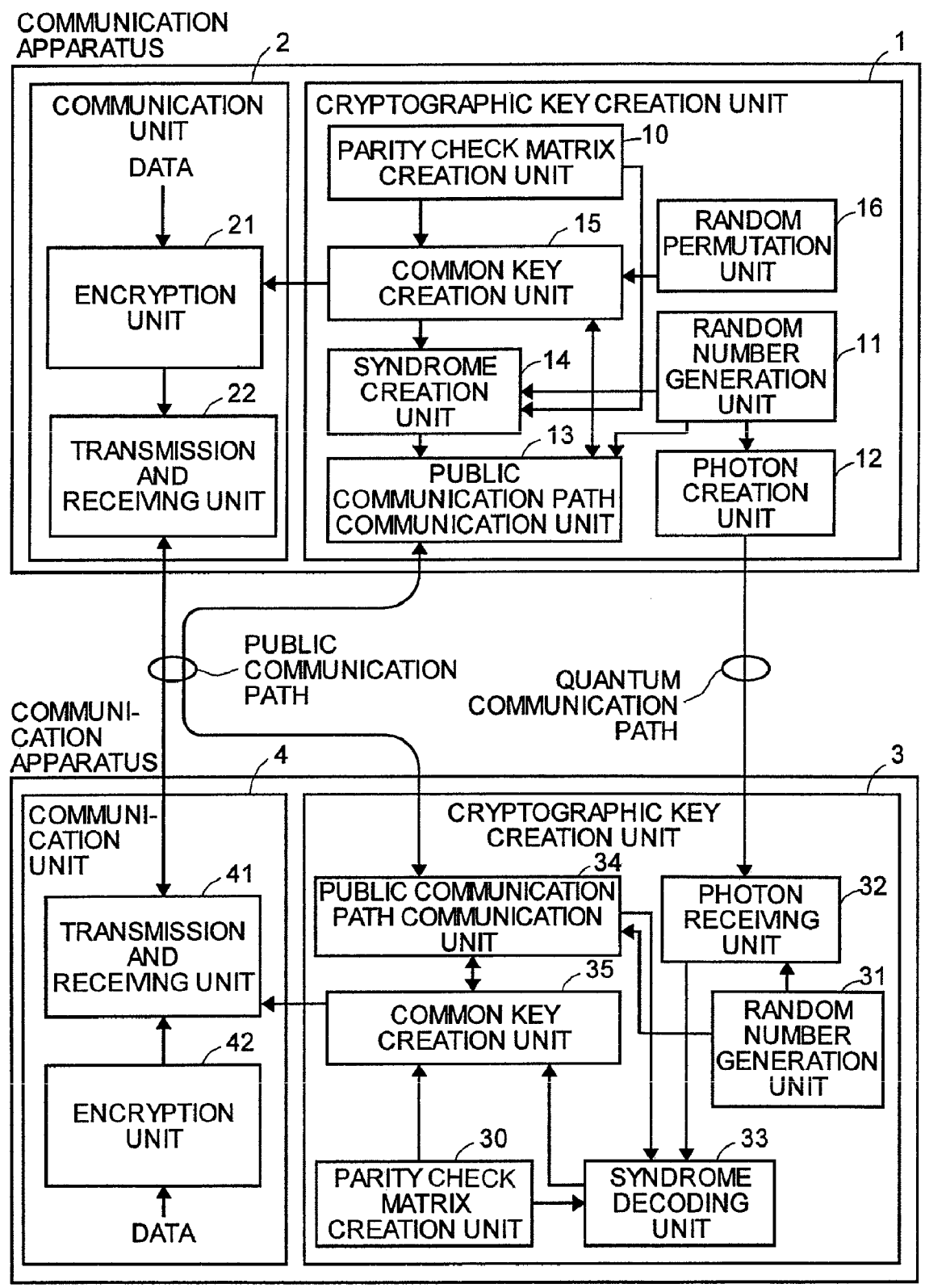
FIG. 7 depicts a configuration of a quantum cryptosystem according to a second embodiment of the invention.

FIG. 7 depicts a configuration of the quantum cryptosystem according to the second embodiment of the invention. Like parts of the configuration as the first embodiment are designated by like reference numerals, and the description of like constituents is omitted. In order to enhance the confidentiality against the information intercepted on the quantum communication path, it is necessary that the information of the bits intercepted is compressed by a hash function. However, the hash function has some positions where interceptions can be easily made, depending on characteristics of the hash function. Therefore, this embodiment deals with intercepts of the hash function by randomly rearranging the position.

Figure 8:
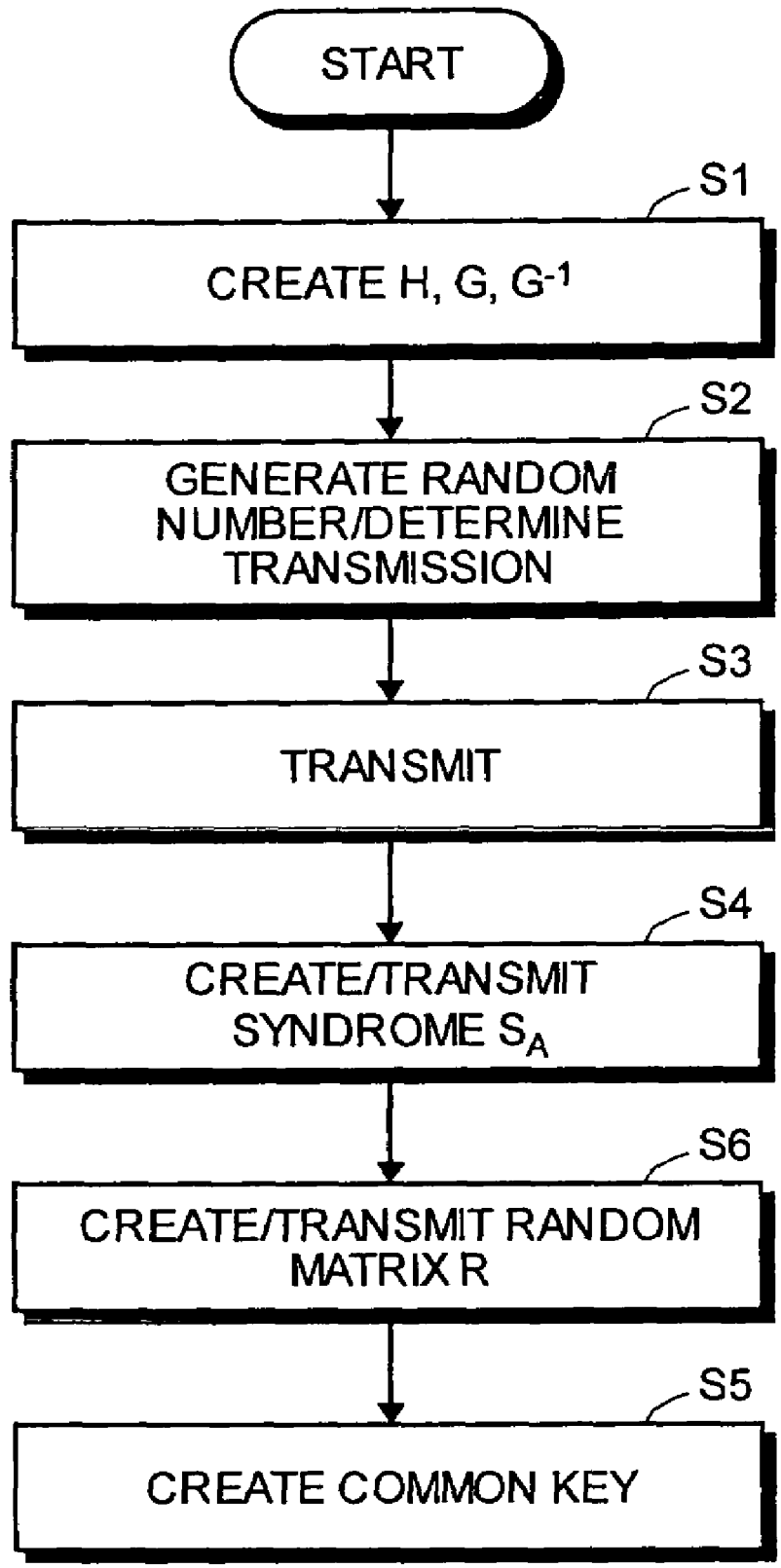
FIG. 8 is a flowchart of a quantum key distribution of the second embodiment of the invention.

FIG. 8 is a flowchart of the quantum key distribution of the second embodiment, particularly depicts the processing of the communication apparatus-on the transmission side. In the communication apparatus on the transmission side, a random permutation unit 16 creates a nonsingular random matrix R((n−k)×(n−k)), notifies the common key creation unit 15 of R, and further notifies the common key creation unit 35 in the communication on the transmission side of R through the public communication path (step S6). In FIGS. 7 and 8, although the random matrix is created and transmitted in the communication apparatus on the transmission side, as an example, it is also possible that the processing is performed in the communication apparatus on the reception side.

In the communication apparatus on the transmission side, the common key creation unit 15 discards a part of pieces of the common information ($m_A$) according to the public error correction information (the information of k bits having a possibility of the intercept: $S_A$), enhances the confidentiality by the received random matrix R, and creates the cryptographic key r including the amount of information of n−k bits (step S5). Namely, the common key creation unit 15 creates the cryptographic key r from the following equation (17) by the received random matrix R((n−k)×(n−k)) and the $G^{-1}$(n×(n−k)) which is calculated in advance (step S5). The communication apparatus on the transmission side shares the cryptographic key r with the communication apparatus on the reception side.

$$r = RG^{-1}m_A \quad (17)$$

On the other hand, in the communication apparatus on the reception side, the common key creation unit 35 also discards a part of pieces of the common information ($m_A$) according to the public error correction information (the information of k bits having a possibility of the intercept: $S_A$), enhances the confidentiality by the received random matrix R, and creates the cryptographic key r including the amount of information of n−k bits (step S17). Namely, the common key creation unit 15 creates the cryptographic key r from the following equation (17) by the received random matrix R((n−k)×(n−k)) and the $G^{-1}$(n×(n−k)) which is calculated in advance (step S17). The communication apparatus on the reception side sets the cryptographic key r to the common key which is shared with the communication apparatus on the transmission side.

As described above, in this embodiment, the data error of the common information is corrected by the deterministic, stable-characteristics parity check matrix H(n×k) for the "Irregular-LDPC code," a part of pieces of the common information is discarded according to the public error correction information, and the common information is rearranged by the nonsingular random matrix. Therefore, the huge number of exchanges of the parity for specifying and correcting the error bit is avoided and error correction control is performed only by transmitting the error correction information, so that the time for the error correction processing is considerably reduced. Since a part of pieces of the common information is discarded according to the public error correction information, the highly-secured common key can be created. Further, since the common information is rearranged by the nonsingular random matrix, the confidentiality can be enhanced.

In this embodiment, similarly to the first embodiment, it is also possible that a part of pieces of the common information (n) is discarded and the cryptographic key r including the amount of information of m bits (m≦n−k). In this case, the common key becomes r=RF($m_A$).

THIRD EMBODIMENT

In the first embodiment, a part of pieces of the common information is discarded by the inverse matrix $G^{-1}$ of the creation matrix G. On the contrary, in the third embodiment, a part of pieces of the common information is discarded without using the inverse matrix $G^{-1}$ of the creation matrix by the characteristics of the parity check matrix H. The configuration of this embodiment is similar to the first embodiment shown in FIG. 1.

The quantum key distribution according to the third embodiment is described below. Only the processing different from the processing in FIG. 2 is described.

In the communication apparatus on the transmission side and the communication apparatus on the reception side, the parity check matrix creation units 10 and 30 determine the parity check matrix H(n×k) of the specific linear code (step S1 and step S11). The method of forming the "Irregular-LDPC code" based on the affine finite geometry (Details of step S1 in FIG. 2) is similar to the first embodiment shown in FIG. 3.

After step S2 to step S4 are performed in the same procedure as the first embodiment, in the communication apparatus on the reception side, the common key creation unit 35 discards a part of pieces of the common information ($m_A$) according to the public error correction information (the information of k bits having a possibility of the intercept: $S_A$) and creates the cryptographic key r including the amount of information of n−k bits (step S17). Specifically, the common key creation unit 35 performs the random permutation to the column of the parity check matrix created in step S11. The common key creation unit 35 then exchanges the information concerning the bit discarded with the communication apparatus on the transmission side through the public communication path. In this case, the common key creation unit 35 selects the specific "1" from the first column of the original finite affine geometry AG(2,$2^S$) and exchanges the position of "1" with the communication apparatus on the transmission side through the public communication path.

The common key creation unit 35 then specifies the position after the division corresponding to the "1" and the position after the division corresponding to the "1" in each cyclically-shifted column from the parity check matrix after the random permutation, discards the bit in the common information $m_A$ corresponding to the specified positions, and makes the saved data the cryptographic key r. The communication apparatus on the reception side sets the cryptographic key r to the common key which is shared with the communication apparatus on the transmission side.

On the other hand, in the communication apparatus on the transmission side, the common key creation unit 15 discards a part of pieces of the common information ($m_A$) according to the public error correction information (the information of k bits having a possibility of the intercept: $S_A$) and creates the cryptographic key r including the amount of information of n−k bits (step S5). Specifically, the common key creation unit 15 performs the similar random permutation to the column of the parity check matrix created in step S1. The common key creation unit 15 then exchanges the information concerning the bit discarded with the communication apparatus on the reception side through the public communication path.

The common key creation unit 15 then specifies the position after the division corresponding to the "1" and the position after the division corresponding to the "1" in each cyclically-shifted column from the parity check matrix after the random permutation, discards the bit in the common information $m_A$ corresponding to the specified positions, and makes the saved data the cryptographic key r. The communication apparatus on the transmission side sets the cryptographic key r to the common key which is shared with the communication apparatus on the reception side.

As described above, in the third embodiment, a part of pieces of the common information is discarded without using the inverse matrix $G^{-1}$ of the creation matrix by the characteristics of the parity check matrix H. Accordingly, the same advantage as the first embodiment can be obtained, and the complicated creation matrix G and the complicated inverse matrix $G^{-1}$ can be deleted.

In this embodiment, it is also possible that a part of pieces of the common information is discarded by the characteristics of the parity check matrix H and, similarly to the second embodiment, the common information is rearranged by the nonsingular random matrix. Therefore, the confidentiality can be enhanced.

As described above, according to the present invention, the data error of the common information is corrected by the deterministic, stable-characteristics parity check matrix H(n× k) for the "Irregular-LDPC code" and a part of pieces of the common information is discarded according to the public error correction information. Accordingly, the present invention has the advantage that the huge number of exchanges of the parity for specifying and correcting the error bit is avoided and error correction control is performed only by transmitting the error correction information, so that the time for the error correction processing is considerably reduced. Further, the invention has the advantage that highly-secured common key can be created because a part of pieces of the common information is discarded according to the public error correction information.

INDUSTRIAL APPLICABILITY

As described above, the quantum key distribution method and the communication apparatus are useful for the quantum cryptosystem which uses the photon as the communication medium, particularly suitable to the apparatus that creates the highly-secured common key.

The invention claimed is:

1. A quantum key distribution method employed on a quantum cryptosystem including a first communication apparatus that transmits photons onto a quantum communication path and a second communication apparatus that measures the photons, comprising:

a check matrix creation step of each of the first communication apparatus and the second communication apparatus creating the same parity check matrices H(n×k);

a random number generation step of the first communication apparatus generating a random number sequence (transmission data) and randomly determining a predetermined transmission code (base) by the first communication apparatus, and the second communication apparatus randomly determining a predetermined reception code (base);

a photon transmission step of the first communication apparatus transmitting a photon onto the quantum communication path while the photon is in a quantum state specified by a combination of the transmission data and the transmission code;

a photon reception step of the second communication apparatus measuring the photon transmitted on the quantum communication path to obtain reception data specified by the combination of the reception code and measurement result;

a data deletion step of each of the first communication apparatus and the second communication apparatus deciding whether the measuring has been performed with an appropriate measuring apparatus, saving the reception data of n bits if the measuring has been performed with the appropriate measuring apparatus and transmission data that corresponds to the reception data, and discarding other pieces of the data;

an error correction information notification step of the first communication apparatus notifying the second communication apparatus through a public communication path of error correction information of k bits based on the parity check matrix H and the transmission data of n bits;

an error correction step of the second communication apparatus correcting the error of the reception data based on the parity check matrix H, the reception data of n bits, and the error correction information; and a cryptographic key creation step of each of the first communication apparatus and the second communication apparatus discarding a part of pieces of the common information after correction according to public error correction information, creating a cryptographic key using information that has remained after discarding, wherein the amount of information remaining is n−k bits, and setting the cryptographic key as a common key which is shared between first communication apparatus and the second communication apparatus.

2. The quantum key distribution method according to claim 1, wherein the check matrix creation step includes:

weight searching step of using finite affine geometry as a basic matrix and searching optimum row and column weight distributions of the parity check matrix by performing optimization of Gaussian approximation; and dividing step of dividing randomly the row and column weights of the finite affine geometry based on the optimum weight distribution by a predetermined procedure, and creating the parity check matrix H of a low-density parity check code in which both the row and column weights or one of the row and column weights is not uniform.

3. The quantum key distribution method according to claim 2, wherein the cryptographic key creation step includes performing random permutation to the column of the parity check matrix H, selecting specific "1" in the first column of finite affine geometry AG(2,$2^s$) of a creation element of the parity check matrix H, exchanges a position of "1" through a public communication path, specifying the position (column) after the division corresponding to "1" from the parity check matrix after the random permutation and the position (column) after the division corresponding to "1" in each cyclically shifted column, and discarding the part of pieces of the common information corresponding to the specified position (column).

4. The quantum key distribution method according to claim 3, wherein the cryptographic key creation step includes:

one of the communication apparatuses, out of the first communication apparatus and the second communication apparatus, creating a nonsingular random matrix R((n−k)×(n−k)) to act on the cryptographic key after discarding the part of pieces of the common information and informing the nonsingular random matrix R to other one of the communication apparatuses through the public communication path, the first communication apparatus and the second communication apparatus using the nonsingular random matrix R to create the cryptographic key.

5. The quantum key distribution method according to claim 1, wherein the check matrix creation step includes creating an inverse matrix $G^{-1}(n \times (n-k))$, which satisfies $G^{-1} \cdot G = I$ (unit matrix), from a creation matrix $G((n-k) \times n)$ satisfying "HG=0;" and the cryptographic key creation step includes discarding the part of pieces of the common information by the inverse matrix $G^{-1}$.

6. The quantum key distribution method according to claim 5, wherein the cryptographic key creation step includes:

one of the communication apparatuses, out of the first communication apparatus and the second communication apparatus, creating a nonsingular random matrix $R((n-k) \times (n-k))$ to act on the cryptographic key after discarding the part of pieces of the common information and informing the nonsingular random matrix R to other one of the communication apparatuses through the public communication path, the first communication apparatus and the second communication apparatus using the nonsingular random matrix R to create the cryptographic key.

7. The quantum key distribution method according to claim 1, wherein the check matrix creation step includes creating a mapping F to map an n-dimensional vector to an m-dimensional vector (m≦n−k), the mapping F being one in which the number of elements of a reverse image $(F \cdot G)^{-1}(v)$ in a composition mapping F·G of the mapping F and the creation matrix G satisfying "HG=0" is independent of an arbitrary m-dimensional vector v and is constant($2^{n-k-m}$), and the cryptographic key creation step includes discarding the part of pieces of the common information by the mapping F.

8. The quantum key distribution method according to claim 7, wherein the cryptographic key creation step includes:

one of the communication apparatuses, out of the first communication apparatus and the second communication apparatus, creating a nonsingular random matrix $R((n-k) \times (n-k))$ to act on the cryptographic key after discarding the part of pieces of the common information and informing the nonsingular random matrix R to other one of the communication apparatuses through a public communication path, the first communication apparatus and the second communication apparatus using the nonsingular random matrix R to create the cryptographic key.

9. A communication apparatus on transmission side that transmits photons onto a quantum communication path, comprising:

a check matrix creation unit that creates a parity check matrix $H(n \times k)$ identical to a communication apparatus on reception side;

a transmission unit that generates a random number sequence (transmission data), randomly determines a predetermined transmission code (base), transmits the photon onto the quantum communication path while the photon is in a quantum state specified by a combination of the transmission data and the transmission code, decides whether the measuring has been performed with an appropriate measuring apparatus in the communication apparatus on the reception side, saves the transmission data of n bits if the measuring has been performed with the appropriate measuring apparatus, and discards other pieces of the transmission data;

an error correction information notifying unit that notifies the communication apparatus on the reception side of error correction information of k bits based on the parity check matrix H and the transmission data of n bits through a public communication path; and a cryptographic key creation unit that discards a part (k) of pieces of the common information after error correction according to public error correction information, creates a cryptographic key using information that has remained after discarding, wherein the amount of information remaining is n−k bits, and sets the cryptographic key as a common key which is shared with the communication apparatus on the reception side.

10. The communication apparatus according to claim 9, wherein the check matrix creation unit uses finite affine geometry as a basic matrix, searches optimum row and column weight distributions of the parity check matrix by performing optimization of Gaussian approximation;

divides randomly the row and column weights of the finite affine geometry based on the optimum weight distribution by a predetermined procedure; and creates the parity check matrix H of a low-density parity check code in which both the row and column weights or one of the row and column weights is not uniform.

11. The communication apparatus according to claim 10, wherein the cryptographic key creation unit performs random permutation to the column of the parity check matrix H, selects specific "1" in the first column of finite affine geometry $AG(2,2^S)$ of a creation element of the parity check matrix H, exchanges a position of "1" through the public communication path, specifies the position (column) after the division corresponding to "1" from the parity check matrix after the random permutation and the position (column) after the division corresponding to "1" in each cyclically shifted column, and discards the part of pieces of the common information corresponding to the specified position (column).

12. The communication apparatus according to claim 11, wherein the cryptographic key creation unit uses a nonsingular random matrix $R((n-k) \times (n-k))$ as the cryptographic key after discarding the part of pieces of the common information.

13. The communication apparatus according to claim 9, wherein the check matrix creation unit further creates an inverse matrix $G^{-1}(n \times (n-k))$, which satisfies $G^{-1} \cdot G = I$ (unit matrix), from a creation matrix $G((n-k) \times n)$ satisfying "HG=0;" and the cryptographic key creation unit discards the part of pieces of the common information by the inverse matrix $G^{-1}$.

14. The communication apparatus according to claim 13, wherein the cryptographic key creation unit uses a nonsingular random matrix $R((n-k) \times (n-k))$ as the cryptographic key after discarding a part of pieces of the common information.

15. The communication apparatus according to claim 9, wherein the check matrix creation unit further creates a mapping F to map an n-dimensional vector to an m-dimensional vector (m≦n−k), the mapping F being one in which the number of elements of a reverse image $(F \cdot G)^{-1}(v)$ in a composition mapping F·G of the mapping F and the creation matrix G satisfying "HG=0" is independent of an arbitrary m-dimensional vector v and is constant($2^{n-k-m}$); and the cryptographic key creation unit discards the part of pieces of the common information by the mapping F.

16. The communication apparatus according to claim 15, wherein the cryptographic key creation unit uses a nonsingular random matrix $R((n-k) \times (n-k))$ as the cryptographic key after discarding the part of pieces of the common information.

17. A communication apparatus on reception side that measures photons on a quantum communication path, comprising:
- a check matrix creation unit that creates a parity check matrix H(n×k) identical to a communication apparatus on transmission side;
- a receiving unit that randomly determines a predetermined reception code (base), measures the photons on the quantum communication path, reproduces reception data specified by a combination of the reception code and measurement result, decides whether the measuring has been performed with an appropriate measuring apparatus, saves the reception data of n bits if the measuring has been performed with the appropriate measuring apparatus, and discards other pieces of the reception data;
- an error correction unit that corrects the error of reception data based on error correction information of k bits received through a public communication path, the parity check matrix H, and the reception data of n bits; and
- a cryptographic key creation unit that discards a part of pieces of the common information after error correction according to public error correction information, creates a cryptographic key using information that has remained after discarding, wherein the amount of information remaining is n-k bits, and sets the cryptographic key as a common key which is shared with the communication apparatus on the transmission side.

18. The communication apparatus according to claim 17, wherein the check matrix creation unit uses finite affine geometry as a basic matrix, searches optimum row and column weight distributions of the parity check matrix by performing optimization of Gaussian approximation;
- divides randomly the row and column weights of the finite affine geometry based on the optimum weight distribution by a predetermined procedure; and
- creates the parity check matrix H of a low-density parity check code in which both the row and column weights or one of the row and column weights is not uniform.

19. The communication apparatus according to claim 18, wherein the cryptographic key creation unit performs random permutation to the column of the parity check matrix H, selects specific "1" in the first column of finite affine geometry $AG(2,2^S)$ of a creation element of the parity check matrix H, exchanges a position of "1" through the public communication path, specifies the position (column) after the division corresponding to "1" from the parity check matrix after the random permutation and the position (column) after the division corresponding to "1" in each cyclically shifted column, and discards a part of pieces of the common information corresponding to the specified position (column).

20. The communication apparatus according to claim 19, wherein the cryptographic key creation unit uses a nonsingular random matrix R((n-k)×(n-k)) as the cryptographic key after discarding the part of pieces of the common information.

21. The communication apparatus according to claim 17, wherein the check matrix creation unit further creates an inverse matrix $G^{-1}$(n×(n-k)), which satisfies $G^{-1} \cdot G = I$ (unit matrix), from a creation matrix G((n-k)×n) satisfying "HG=0;" and
- the cryptographic key creation unit discards a part of pieces of the common information by the inverse matrix $G^{-1}$.

22. The communication apparatus according to claim 21, wherein the cryptographic key creation unit uses a nonsingular random matrix R((n-k)×(n-k)) as the cryptographic key after discarding a part of pieces of the common information.

23. The communication apparatus according to claim 17, wherein the check matrix creation unit further creates a mapping F to map an n-dimensional vector to an m-dimensional vector (m≦n-k), the mapping F being one in which the number of elements of a reverse image $(F \cdot G)^{-1}(v)$ in a composition mapping F·G of the mapping F and the creation matrix G satisfying "HG=0" is independent of an arbitrary m-dimensional vector v and is constant($2^{n-k-m}$); and
- the cryptographic key creation unit discards the part of pieces of the common information by the mapping F.

24. The communication apparatus according to claim 23, wherein the cryptographic key creation unit uses a nonsingular random matrix R((n-k)×(n-k)) as the cryptographic key after discarding the part of pieces of the common information.

* * * * *